US011254251B2

(12) United States Patent
Wu et al.

(10) Patent No.: US 11,254,251 B2
(45) Date of Patent: Feb. 22, 2022

(54) GRAB HANDLE AND HUMAN BODY STANDING ASSIST DEVICE

(71) Applicant: BOE TECHNOLOGY GROUP CO., LTD., Beijing (CN)

(72) Inventors: Yunpeng Wu, Beijing (CN); Zifeng Wang, Beijing (CN); Qiang Wang, Beijing (CN); Bin Shen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 16/647,850

(22) PCT Filed: Aug. 22, 2019

(86) PCT No.: PCT/CN2019/101966
§ 371 (c)(1),
(2) Date: Mar. 16, 2020

(87) PCT Pub. No.: WO2020/093755
PCT Pub. Date: May 14, 2020

(65) Prior Publication Data
US 2021/0221272 A1   Jul. 22, 2021

(30) Foreign Application Priority Data

Nov. 5, 2018   (CN) .......................... 201821816840.5

(51) Int. Cl.
*B60N 3/02* (2006.01)
*G09F 21/04* (2006.01)

(52) U.S. Cl.
CPC ............... *B60N 3/02* (2013.01); *G09F 21/04* (2013.01)

(58) Field of Classification Search
CPC .......... B60N 3/026; B60N 3/023; B60N 3/02; B60N 2/78; B60N 2/24; B60N 2/4235;
(Continued)

(56) References Cited

U.S. PATENT DOCUMENTS 1,812,972 A  *  7/1931  Miller .................... B61D 49/00
                                                                40/318
10,399,476 B2 *  9/2019  Ranganathan ............ B60R 7/04
(Continued)

FOREIGN PATENT DOCUMENTS

CN   202319999 U   7/2012
CN   205589039 U   9/2016
(Continued)

OTHER PUBLICATIONS

International Search Report received for PCT Patent Application No. PCT/CN2019/101966, dated Nov. 15, 2019, 6 pages (2 pages of English Translation and 4 pages of Original Document).

*Primary Examiner* — D Glenn Dayoan
*Assistant Examiner* — Sunsurraye Westbrook
(74) *Attorney, Agent, or Firm* — Womble Bond Dickinson (US) LLP

(57) ABSTRACT

A grab handle includes a first shell, a second shell, and a display member between the first shell and the second shell. The first shell has a first accommodating portion and a first fixing mechanism. The second shell has a second accommodating portion and a second fixing mechanism. The grab handle is configured to, through a cooperation of the first fixing mechanism and the second fixing mechanism, fix the first shell and the second shell to each other and form an accommodating space by the first accommodating portion and the second accommodating portion together for accommodating the display member.

20 Claims, 4 Drawing Sheets

(58) Field of Classification Search
CPC ...... B60N 2/42709; B60N 2/02; B60N 2/245; B60N 2002/905
USPC ..... 296/1.02, 71, 214, 64, 146.7, 57.1, 1.08, 296/24.34, 62, 205
See application file for complete search history.

(56) References Cited

U.S. PATENT DOCUMENTS

| | | | | |
|---|---|---|---|---|
| 2007/0079478 | A1* | 4/2007 | Gordienko | B60N 3/02 16/428 |
| 2010/0115809 | A1* | 5/2010 | Pacheco | G09F 21/049 40/318 |
| 2013/0341947 | A1* | 12/2013 | Huelke | B60N 3/026 296/1.02 |

FOREIGN PATENT DOCUMENTS

| | | |
|---|---|---|
| CN | 209225020 U | 8/2019 |
| JP | 06-127380 A | 5/1994 |

\* cited by examiner

GRAB HANDLE AND HUMAN BODY STANDING ASSIST DEVICE

CROSS REFERENCE TO RELATED APPLICATIONS

The present application is a 35 U.S.C. 371 national stage application of a PCT International Application No. PCT/CN2019/101966, filed on Aug. 22, 2019, which claims the benefit of a Chinese Patent Application No. 201821816840.5, filed on Nov. 5, 2018, the contents of which are incorporated herein by reference in their entireties.

TECHNICAL FIELD

The present disclosure relates to a grab handle and a human body standing assist device.

BACKGROUND

Advertising on buses or subways is an important source of income for public transport providers. Due to the increasingly fierce competition in the advertising industry, it is especially crucial for public transport providers to improve their advertising quality. For example, the advertisement of the existing subway grab handle is usually realized by sandwiching a paper advertisement between the shells of the grab handle. However, due to the need to install hundreds of grab handles in subway carriages, it takes a lot of labor and time to replace the advertisements of the grab handles, which also results in a long advertisement update cycle and a high advertisement replacement cost.

In addition, the shells of the grab handle are usually fixed together by screws at present. When replacing paper advertisements, workers need to unscrew the screws, replace the advertisements, and finally tighten the screws. Such disassembly method is old-fashioned and complicated, which will further increase the advertisement update cycle and increase the time and labor cost for replacing advertisements.

SUMMARY

In view of this, in a first aspect, some exemplary embodiments of the present disclosure provide a grab handle comprising:
a first shell;
a second shell; and
a display member between the first shell and the second shell,
wherein the first shell has a first accommodating portion and a first fixing mechanism, the second shell has a second accommodating portion and a second fixing mechanism, and the grab handle is configured to, through a cooperation of the first fixing mechanism and the second fixing mechanism, fix the first shell and the second shell to each other and form an accommodating space by the first accommodating portion and the second accommodating portion together for accommodating the display member.

Optionally, the display member includes an electronic ink screen.

Optionally, the first fixing mechanism includes a plurality of protrusions that are arranged in an annular shape as a whole on the side wall at the outer periphery of the first accommodating portion. The second fixing mechanism comprises a plurality of extensions that are arranged in an annular shape as a whole on the side wall at the outer periphery of the second accommodating portion. Each of the plurality of extensions is provided with a groove for snap-fit with a corresponding one of the plurality of protrusions.

Optionally, a tapered portion is provided at one end of the extension, and a size of a free end of the tapered portion is smaller than a size of a non-free end of the tapered portion, so that the tapered portion is pushed and slid over the protrusion easily in order to engage the protrusion in the groove.

Optionally, the inner wall of the first shell is provided with a plurality of first limit stops, wherein a part of the first limit stops are arranged in a first direction, another part of the first limit stops are arranged in a second direction perpendicular to the first direction, and the first limit stops are configured to fix a portion of the display member.

Optionally, the inner wall of the second shell is provided with a plurality of second limit stops extending in the first direction to fix another portion of the display member.

Optionally, the distance between the two adjacent first limit stops is equal to the distance between the two adjacent second limit stops.

Optionally, the first shell further comprises an opening and a grip, wherein the opening is arranged at one side of the first accommodating portion, the grip is arranged at the other side of the first accommodating portion, and the opening and the grip are integrally formed with the first shell.

Optionally, a transparent protective cover is arranged on the outer wall of the first shell, and the transparent protective cover covers the display member. The outer wall of the second shell is also provided with a groove.

Optionally, the second shell further comprises a plurality of reinforcing ribs arranged on the inner wall of the second shell, and the reinforcing ribs and the second limit stops are arranged separately from each other.

Optionally, reflective material is coated on the outer surfaces of the first shell and the second shell other than the transparent protective cover and the groove.

Optionally, the first shell and the second shell are made of plastic or resin material.

In a second aspect, some exemplary embodiments of the present disclosure further provide a human body standing assist device for public transport means, including the grab handle as described in any one of the first aspects above.

The above description is only an overview of the technical solutions according to some exemplary embodiments of the present disclosure. In order to make the technical means of the embodiments of the present disclosure better understood and can be implemented according to the contents of the specification, and to make the above and other objects, features and advantages of the embodiments of the present disclosure more obvious and understandable, some exemplary embodiments of the present disclosure are described in detail below.

BRIEF DESCRIPTION OF THE DRAWINGS

Various other advantages and benefits of the present disclosure will become apparent to those of ordinary skill in the art from the following detailed description of exemplary embodiments. The drawings are for the purpose of illustrating exemplary embodiments only and are not to be considered as limiting the embodiments of the present disclosure. Moreover, the same reference numerals are used to refer to the same parts throughout the drawings. In the drawings.

DETAILED DESCRIPTION OF THE DISCLOSURE

Figure 1:
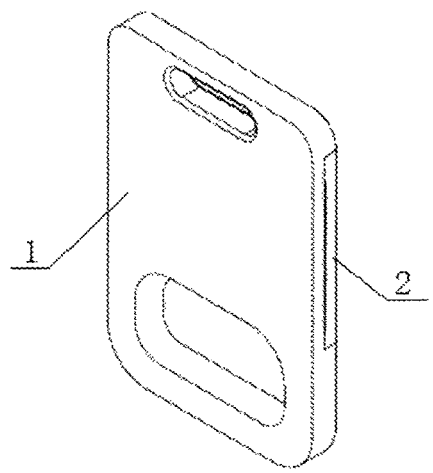
FIG. 1 is a stereoscopic schematic view of a grab handle in the related art.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. On the contrary, these exemplary embodiments are provided to enable a more thorough understanding of the present disclosure and to fully convey the scope of the present disclosure to those skilled in the art.

Figure 2:
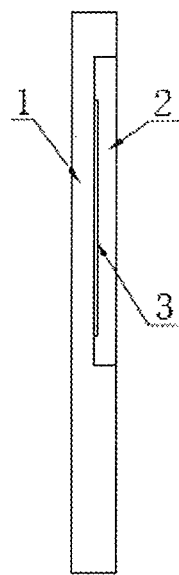
FIG. 2 is a side view of the grab handle of FIG. 1.

FIGS. 1 and 2 show a stereoscopic diagram and a side view of a grab handle in the related art, respectively. As shown in FIGS. 1 and 2, the advertisement of the traditional grab handle is presented to users for viewing by sandwiching a paper advertisement in the middle of the grab handle. Referring to FIG. 2, the advertisement of the traditional grab handle is to place a paper advertisement in the advertisement slot 3 between a front shell 1 and a rear cover 2 of the grab handle. The front shell 1 and the rear cover 2 are locked by screws. When replacing the advertisement, the steps of removing the screws, replacing the paper advertisement and locking the screws are required.

The inventor of the present application found that the traditional grab handle has the following problems when in use:

1. When the grab handle is used in subway, it takes a lot of labor and time to replace the advertisement of the grab handle, resulting in a long advertisement update cycle and a high advertisement replacement cost.

2. As the front shell 1 and the rear cover 2 are usually fixed by a plurality of screws, when the advertisement is disassembled and replaced, the plurality of screws must be disassembled in sequence and installed again after the advertisement content is replaced, thus increasing the difficulty of the replacement, further leading to a long advertisement update cycle of the subway grab handle and a high advertisement replacement cost.

In order to overcome the above problems, some exemplary embodiments of the present disclosure provide a grab handle and a human body standing assist device including the grab handle, which can solve the problems of long advertisement update cycle, high time and labor cost for replacing advertisement in the related art.

Referring to FIGS. 3-6, the grab handle provided by some exemplary embodiments of the present disclosure includes a first shell 4 having a first accommodating portion and a first fixing mechanism 6, and a second shell 5 having a second accommodating portion and a second fixing mechanism 7. The grab handle is configured to, through a cooperation of the first fixing mechanism 6 and the second fixing mechanism 7, fix the first shell 4 and the second shell 5 to each other and form an accommodating space by the first accommodating portion and the second accommodating portion together (or jointly).

Since the grab handle of the present disclosure is configured to form the accommodating space through the cooperation of the first shell 4 and the second shell 5, the accommodating space can accommodate, for example, a display member 8 when needed, and the first shell 4 and the second shell 5 are fixed to each other through the cooperation of the first fixing mechanism 6 and the second fixing mechanism 7, avoiding the use of traditional fixing members such as screws, greatly shortening the advertisement update cycle and reducing the time and labor cost for replacing advertisements.

Figure 3:
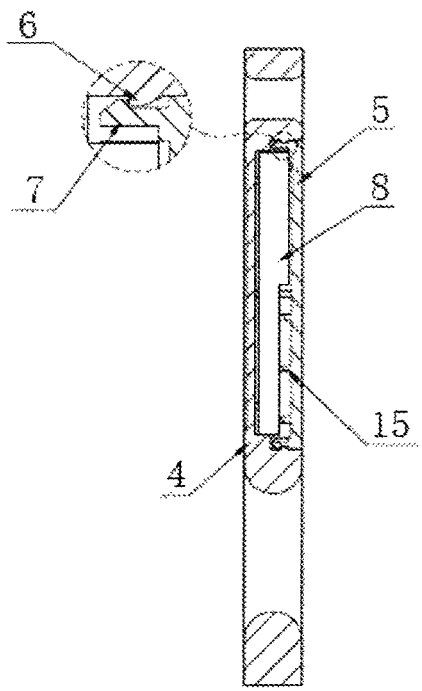
FIG. 3 is a schematic side sectional view of a grab handle according to some exemplary embodiments of the present disclosure.
Figure 4:
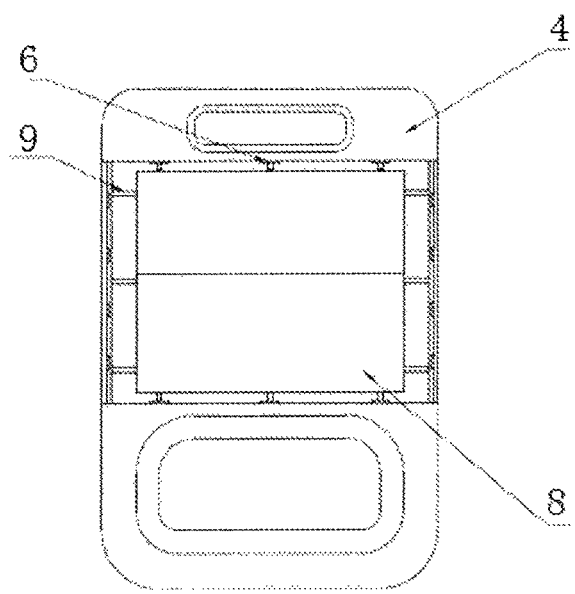
FIG. 4 is a schematic front view of a grab handle according to some exemplary embodiments of the present disclosure, showing a first shell with a display installed therein.
Figure 5:
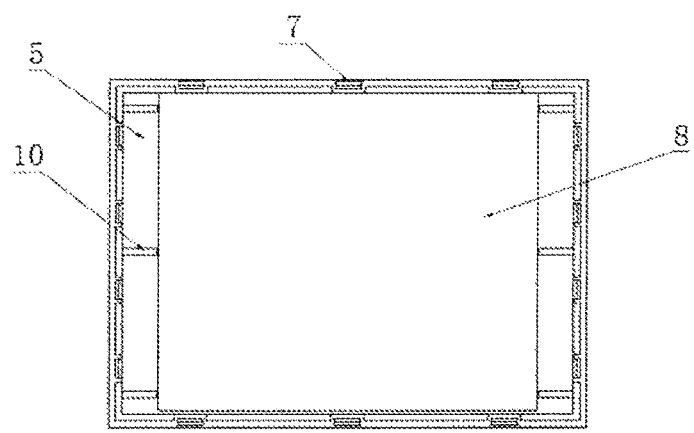
FIG. 5 is a schematic rear view of a grab handle according to some exemplary embodiments of the present disclosure, showing a second shell with a display installed therein.
Figure 6:
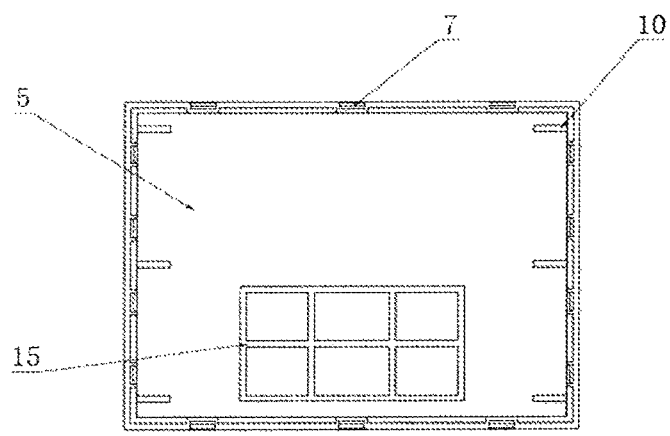
FIG. 6 is a schematic rear view of a grab handle according to other exemplary embodiments of the present disclosure, showing a second shell without a display.

As shown in FIGS. 4-6, in some exemplary embodiments of the present application, a plurality of first fixing mechanisms 6 are provided on the first shell 4, and the plurality of first fixing mechanisms 6 are arranged in an annular shape as a whole on the side wall at the outer periphery of the first accommodating portion. Accordingly, a plurality of second fixing mechanisms 7 are arranged on the second shell 5, and the plurality of second fixing mechanisms 7 are arranged in an annular shape as a whole on the side wall at the outer periphery of the second accommodating portion. The positions of the plurality of first fixing mechanisms 6 correspond to the positions of the plurality of second fixing mechanisms 7. When in use, by means of the plurality of first fixing mechanisms 6 and the plurality of second fixing mechanisms 7 snap-fitted with each other, the first shell 4 and the second shell 5 can be locked to each other. After locking, the plurality of first fixing mechanisms 6 and the plurality of second fixing mechanisms 7 are all located at the periphery of the accommodation space. Compared with the traditional subway grab handle, in the present disclosure, traditional fixing parts such as screws can be dispensed with, greatly shortening the advertisement update cycle, reducing the time and labor cost for replacing advertisements, and preventing passengers from disassembling. It should be emphasized that for each of the plurality of first fixing mechanisms 6, only an engagement surface (also called a working surface) for engaging with a corresponding second fixing mechanism 7 is shown by way of example in FIG. 3 on the inner surface of the side wall of the first accommodating portion. Accordingly, for each of the plurality of second fixing mechanisms 7, FIG. 3 only exemplarily shows that an engaging surface (also called a working surface) for engaging with a corresponding first fixing mechanism 6 is located on the outer surface of the side wall of the second accommodating portion. Of course, the engagement surface of the first fixing mechanism 6 and the engagement surface of the second fixing mechanism 7 may be exchanged, that is, the engagement surface of the first fixing mechanism 6 may be provided on the outer surface of the side wall of the first accommodating portion, while the engagement surface of the second fixing mechanism 7 may be provided on the inner surface of the side wall of the second accommodating portion. Similarly, after locking, the plurality of first fixing mechanisms 6 and the plurality of second fixing mechanisms 7 are all located at the periphery of the accommodation space.

Specifically, as shown in FIG. 4, the grab handle further includes the display member 8 arranged between the first shell and the second shell and fixedly arranged in the accommodating space. In some exemplary embodiments of the present disclosure, the display member 8 includes an electronic ink screen. However, for those skilled in the art, the selection of the display member 8 can also be made according to actual needs. For example, the display member 8 can also include other suitable types of displays such as liquid crystal displays, electrophoretic displays, etc.

Taking the electronic ink screen as an example, it does not consume electricity when the picture is not updated, it has the advantages of low power consumption, no radiation, etc., and it has a long service life. Furthermore, it is convenient to refresh the picture without disassembly. When it is applied in the grab handle, it can greatly shorten the advertisement update cycle and reduce the time and labor cost for replacing the advertisement. Since the grab handle according to the present disclosure does not use common advertisement paper, but uses an electronic ink screen to play advertisements instead, convenient replacement of advertisements can be realized by connecting the electronic ink screen to a base station, which greatly reduces the time and labor cost for replacing advertisements, and shortens the advertisement update cycle.

In addition, the grab handle of the present disclosure is provided with the display member 8, which can avoid disassembling the grab handle to replace paper advertisements and shorten the replacement cycle and time. In addition, the use of the ink screen reduces manufacturing and use costs while displaying images.

More specifically, referring to FIG. 3, the first fixing mechanism 6 includes a plurality of protrusions arranged around the first accommodating portion. The second fixing mechanism 7 includes a plurality of extensions, and the extensions are arranged around the second accommodating portion. Each of the extensions is provided with a groove. When used after assembly, each protrusion of the protrusions is arranged in a corresponding groove, and is engaged and fixed with the groove. The first fixing mechanism and the second fixing mechanism are respectively arranged on the first shell 4 and the second shell 5, and are engaged and fixed with each other. Therefore, the installation is convenient, and the fixing by using traditional screws is avoided, thereby reducing the time and labor cost for replacing advertisements.

In order to facilitate the protrusion to be more easily arranged in the groove, a tapered portion is provided at one end of the extension, and a size of a free end of the tapered portion is smaller than that of a non-free end thereof, so that the tapered portion is pushed and slid over the protrusion of the first fixing mechanism 6 easily in order to engage the protrusion in the groove of the extension of the second fixing mechanism 7, thereby realizing the mutual fixed cooperation between the first fixing mechanism 6 and the second fixing mechanism 7. For ease of understanding, taking the enlarged view in FIG. 3 as an example, the free end and non-free end of the tapered portion are specifically explained as follows: the free end of the tapered portion is the leftmost end portion (end face) of the tapered portion; the non-free end of the tapered portion is the bottom surface of the tapered portion parallel to the free end and at a certain distance from the free end. In addition, the shape of the tapered portion may be at least one selected from a group consisting of a pyramid, a truncated pyramid, a cone, and a truncated cone.

Referring to FIG. 4, according to some embodiments of the present disclosure, optionally, the inner wall of the first shell 4 is provided with a plurality of strip-shaped first limit stops 9, wherein a part of the first limit stops 9 are arranged in a first direction (the first direction in FIG. 4 is the horizontal direction when the grab handle is freely suspended after installation) and a another part of the first limit stops are arranged in a second direction perpendicular to the first direction (the second direction in FIG. 4 is the vertical direction when the grab handle is freely suspended after installation). The first limit stops 9 are used to fix a portion of the display member 8.

Referring to FIG. 5, according to some embodiments of the present disclosure, optionally, the inner wall of the second shell 5 may be provided with a plurality of strip-shaped second limit stops 10 extending in a first direction (the first direction in FIG. 5 is the horizontal direction when the grab handle is freely suspended after installation) for fixing another portion of the display member 8.

Due to the provision of the first limit stops 9 and the second limit stops 10, the display member 8 arranged in the accommodating space is further stabilized, the display member 8 is prevented from randomly moving in the accommodating space, and the display effect is enhanced.

The distance between the two adjacent first limit stops 9 and the distance between the two adjacent second limit stops 10 can be set to be substantially equal. Setting the distance between the two adjacent first limit stops 9 and the distance between the two adjacent second limit stops 10 to be substantially equal helps to enhance the fixing effect of the first limit stops 9 and the second limit stops 10 on the display member 8, so as to meet the equal strength principle and prolong the maintenance period or service life of the grab handle.

In some exemplary embodiments, as shown in FIG. 6, the second shell 5 further includes a plurality of reinforcing ribs 15 arranged on the inner wall of the second shell 5, and the reinforcing ribs 15 and the second limit stop 10 are arranged separately from each other. Since the reinforcing ribs 15 are provided on the inner wall of the second shell 5, the shape and size (especially the thickness size) of the display member 8 can be matched by adjusting the height of part of the reinforcing ribs 15, and the display member 8 is tightly abutted in the front-rear direction (i.e., the thickness direction of the grab handle), so that the display member 8 is fixed in the accommodating space and cannot move, further enhancing its stability and reliability.

In some exemplary embodiments, the first shell 4 and the second shell 5 are made of plastic or resin materials, which can reduce manufacturing and maintenance costs.

Figure 7:
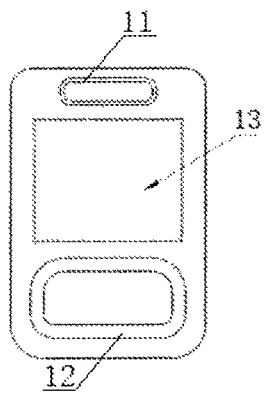
FIG. 7 is a front view of a grab handle according to some exemplary embodiments of the present disclosure.
Figure 8:
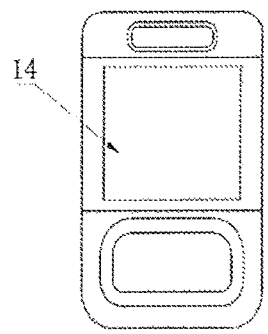
FIG. 8 is a rear view of a grab handle according to some exemplary embodiments of the present disclosure.

FIGS. 7 and 8 show a front view and a rear view, respectively, of a grab handle according to an exemplary embodiment of the present disclosure, wherein, as shown in FIG. 7, the first shell 4 further includes an opening 11 and a grip (grip portion) 12, the opening 11 is provided at one side of the first accommodating portion, the grip 12 is provided at the other side of the first accommodating portion, and the opening 11 and the grip 12 are integrally formed with the first shell 4. The opening 11 and the grip 12 are integrally formed on the first shell 4, so that when a user of the grip holds the grip 12, only the first shell 4 is stressed and the second shell 5 is not subject to the stress. In the manufacturing process, the strength and stability of the entire grab handle can be enhanced by increasing the material strength of the first shell 4.

With continued reference to FIG. 7, in some exemplary embodiments, a transparent protective cover 13 is provided on the outer wall of the first shell 4, and the transparent protective cover 13 covers the display member 8 for protecting the display member. In some exemplary embodiments of the present disclosure, the transparent protective cover 13 is a transparent acrylic plate.

As shown in FIG. 8, in some exemplary embodiments, the outer wall of the second shell 5 is further provided with a groove 14. Advertisements that do not need be replaced frequently can be pasted at the groove 14 to enhance the practicability of the grab handle.

In some exemplary embodiments, in order to facilitate the user of the grip to observe the environment behind him, reflective material such as reflective paint is coated on the outer surfaces of the first shell 4 and the second shell 5 other than the transparent protective cover 13 and the groove 14, so that the user can observe the situation behind him through specular reflection while using the grab handle to prevent thieves from approaching. Of course, in actual design, other materials may be coated on the outer surfaces of the first shell 4 and the second shell 5 according to actual conditions.

Another aspect of the application of the present disclosure also provides a human body standing assist device for public transport means, including the grab handle provided in the above embodiment of the application.

Specifically, the human body standing assist device comprises a cross bar arranged in a public bus or a subway, the grab handle provided by the above embodiment of the application can be arranged on the cross bar, and in specific implementation, the grab handle is arranged on the cross bar through the opening included in the grab handle.

By applying the grab handle and the human body standing assist device provided by the above embodiments of the disclosure, the beneficial effects that can be obtained include:

1. As the grab handle of the application forms the accommodating space through the cooperation of the first shell and the second shell, the accommodating space can accommodate, for example, a display member when needed, and by means of the first fixing mechanism and the second fixing mechanism, the first shell and the second shell are cooperatively fixed, thus avoiding the use of traditional fixing parts such as screws and the like, and greatly reducing the time and labor cost for replacing advertisements.

2. The display member is arranged in the grab handle of the embodiment of the application, and a display screen such as an electronic ink screen can be adopted to replace common advertisement paper, so that the disassembling of the grab handle is avoided to replace paper advertisements, and the replacement cycle and time is shortened.

3. According to the embodiment of the application, the fixing mechanisms are respectively arranged on the first shell and the second shell, and are engaged and fixed with each other, so that the installation is convenient, the fixing by using traditional screws is avoided, and the time and labor cost for replacing advertisements are reduced.

4. According to the embodiment of the present application, reflective material such as reflective paint can be coated on the outer surfaces of the first shell and the second shell other than the transparent protective cover and the groove, so that a user of the grip can observe the situation behind him through light reflection.

It should be understood that although various features and beneficial effects of the present disclosure and specific details of the structure and function of the present disclosure have been set forth in the above description, these contents are merely exemplary, and the specific details thereof, especially the shape, size, number and arrangement of components, may be specifically changed within the scope of the principles of the present disclosure to the overall scope represented by the broad general meaning as claimed in the claims of the present disclosure.

Unless otherwise defined, all technical and scientific terms used in this specification have the same meaning as commonly understood by those skilled in the art to which this disclosure belongs.

Those skilled in the art will understand the term "substantially" herein (such as in "substantially all light" or in "substantially composed of"). The term "substantially" may also include embodiments having "wholly," "completely," "all," etc. Therefore, in the embodiment, the adjective is also substantially removable. Where applicable, the term "substantially" may also refer to 90% or more, such as 95% or more, specifically 99% or more, even more specifically 99.5% or more, including 100%. The term "comprising" also includes embodiments in which the term "comprising" means "consisting of". The term "and/or" specifically refers to one or more of the items mentioned before and after "and/or". For example, the phrase "item 1 and/or item 2" and similar phrases may relate to one or more of items 1 and 2. The term "comprising" may refer to "consisting of" in one embodiment, but may also refer to "including at least a defined category and optionally one or more other categories" in another embodiment.

Furthermore, the terms first, second, third, etc. in this specification and in the claims are used to distinguish between similar elements and do not denote any order, quantity, or importance. It should be understood that the terms so used are interchangeable under appropriate circumstances and that the embodiments of the present disclosure described herein are capable of operation in a different order than described or illustrated herein.

"Up", "down", "left" and "right" are only used to indicate the relative positional relationship. When a absolute position of a described object changes, its relative positional relationship may also change accordingly.

It should be noted that the above-mentioned embodiments illustrate rather than limit the present disclosure, and that those skilled in the art will be able to design many alternative embodiments without departing from the scope of the appended claims. In the claims, any reference signs placed between parentheses shall not be construed as limiting the claims. The use of the verb "to include" and its conjugations does not exclude the presence of elements or steps other than those stated in the claims. The words "a" or "an" in the claims of the present disclosure do not exclude plural numbers, and are only intended for convenience of description and should not be construed as limiting the scope of protection of the present disclosure.

The present disclosure may be implemented by means of hardware comprising several distinct elements, and by means of a suitably programmed computer. In the device claim enumerating several devices, several of these devices can be embodied by the same item of hardware. The mere fact that certain measures are recited in mutually different dependent claims does not indicate that a combination of these measures cannot be used to advantage.

The present disclosure is further applicable to devices that include one or more of the characterizing features described in this specification and/or shown in the drawings. The present disclosure further relates to methods or processes that include one or more of the characterizing features described in this specification and/or shown in the drawings.

Various aspects discussed in this disclosure may be combined to provide additional advantages. In addition, those skilled in the art will understand that embodiments can be combined, and more than two embodiments can also be combined. In addition, some features may form the basis of one or more divisional applications.

The invention claimed is:
1. A grab handle comprising:
a first shell;
a second shell; and
a display member between the first shell and the second shell,
wherein the first shell has a first accommodating portion and a first fixing mechanism, the second shell has a second accommodating portion and a second fixing mechanism, and the grab handle is configured to, through a cooperation of the first fixing mechanism and the second fixing mechanism, fix the first shell and the second shell to each other and form an accommodating space by the first accommodating portion and the second accommodating portion together for accommodating the display member,
wherein the first fixing mechanism is integrally formed with the first shell, the second fixing mechanism is integrally formed with the second shell, the first fixing mechanism comprises a plurality of protrusions, the second fixing mechanism comprises a plurality of extensions, and the first fixing mechanism and the second fixing mechanism are configured to fix the first shell and the second shell to each other through a snap-fit between the plurality of protrusions and the plurality of extensions.

2. The grab handle according to claim 1, wherein the display member comprises an electronic ink screen.

3. The grab handle according to claim 1,
wherein the protrusions are arranged in an annular shape as a whole on a side wall at an outer periphery of the first accommodating portion,
wherein the extensions are arranged in an annular shape as a whole on a side wall at an outer periphery of the second accommodating portion, and
each of the plurality of extensions is provided with a groove for snap-fit with a corresponding one of the plurality of protrusions.

4. The grab handle according to claim 3, wherein a tapered portion is provided at an end of the extension, and a size of a free end of the tapered portion is smaller than a size of a non-free end of the tapered portion, so that the tapered portion is pushed and slid over the protrusion easily in order to engage the protrusion in the groove.

5. The grab handle according to claim 4, wherein the inner wall of the first shell is provided with a plurality of first limit stops, wherein a part of the first limit stops are arranged in a first direction, another part of the first limit stops are arranged in a second direction perpendicular to the first direction, and the first limit stops are configured to fix a portion of the display member.

6. The grab handle according to claim 5, wherein an inner wall of the second shell is provided with a plurality of second limit stops extending in the first direction to fix another portion of the display member.

7. The grab handle according to claim 6, wherein a distance between two adjacent first limit stops is equal to a distance between two adjacent second limit stops.

8. The grab handle according to claim 1, wherein the first shell further comprises an opening and a grip, wherein the opening is arranged at one side of the first accommodating portion, the grip is arranged at the other side of the first accommodating portion, and the opening and the grip are integrally formed with the first shell.

9. The grab handle according to claim 6, wherein the second shell further comprises a plurality of reinforcing ribs on the inner wall of the second shell, and the reinforcing ribs and the second limit stops are arranged separately from each other.

10. The grab handle according to claim 1,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

11. A human body standing assist device for public transport means, comprising a grab handle having:
a first shell;
a second shell; and
a display member between the first shell and the second shell,
wherein the first shell has a first accommodating portion and a first fixing mechanism, the second shell has a second accommodating portion and a second fixing mechanism, and the grab handle is configured to, through a cooperation of the first fixing mechanism and the second fixing mechanism, fix the first shell and the second shell to each other and form an accommodating space by the first accommodating portion and the second accommodating portion together for accommodating the display member.

12. The grab handle according to claim 2,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

13. The grab handle according to claim 3,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

14. The grab handle according to claim 4,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

15. The grab handle according to claim 5,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

16. The grab handle according to claim 6,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

17. The grab handle according to claim 7,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

18. The grab handle according to claim 8,
wherein a transparent protective cover is arranged on an outer wall of the first shell, the transparent protective cover is configured to cover the display member, an outer wall of the second shell is provided with a groove, and
wherein outer surfaces of the first shell and the second shell other than the transparent protective cover and the groove are coated with reflective material.

19. The human body standing assist device for public transport means according to claim 11, wherein the display member comprises an electronic ink screen.

20. The human body standing assist device for public transport means according to claim 11,
wherein the first fixing mechanism comprises a plurality of protrusions, and the protrusions are arranged in an annular shape as a whole on a side wall at an outer periphery of the first accommodating portion,
wherein the second fixing mechanism comprises a plurality of extensions, and the extensions are arranged in an annular shape as a whole on a side wall at an outer periphery of the second accommodating portion, and
each of the plurality of extensions is provided with a groove for snap-fit with a corresponding one of the plurality of protrusions.

* * * * *